(12) United States Patent
Zhang et al.

(10) Patent No.: US 11,993,298 B2
(45) Date of Patent: May 28, 2024

(54) MOVING BLOCK TRAIN OPERATION CONTROL METHOD AND SYSTEM BASED ON TRAIN AUTONOMOUS POSITIONING

(71) Applicant: CASCO SIGNAL LTD., Shanghai (CN)

(72) Inventors: Yajing Zhang, Shanghai (CN); Qingbiao Xu, Shanghai (CN); Xianliang Xu, Shanghai (CN); Tao Wang, Shanghai (CN); Zhixin Chen, Shanghai (CN); Jiqing Na, Shanghai (CN); Liang Guo, Shanghai (CN)

(73) Assignee: CASCO SIGNAL LTD., Shanghai (CN)

( * ) Notice: Subject to any disclaimer, the term of this patent is extended or adjusted under 35 U.S.C. 154(b) by 308 days.

(21) Appl. No.: 17/596,092

(22) PCT Filed: Oct. 19, 2020

(86) PCT No.: PCT/CN2020/121782
§ 371 (c)(1),
(2) Date: Dec. 2, 2021

(87) PCT Pub. No.: WO2021/143238
PCT Pub. Date: Jul. 22, 2021

(65) Prior Publication Data
US 2022/0315072 A1    Oct. 6, 2022

(30) Foreign Application Priority Data
Jan. 15, 2020   (CN) .......................... 202010043715.0

(51) Int. Cl.
*B61L 25/02*    (2006.01)
*B61L 25/04*    (2006.01)

(52) U.S. Cl.
CPC ........... *B61L 25/021* (2013.01); *B61L 25/025* (2013.01); *B61L 25/04* (2013.01)

(58) Field of Classification Search
CPC ....... B61L 25/021; B61L 25/025; B61L 25/04
(Continued)

(56) References Cited

U.S. PATENT DOCUMENTS

| 2008/0195265 | A1* | 8/2008 | Searle | ................. | B61L 15/0081 |
| | | | | | 701/19 |
| 2018/0009454 | A1* | 1/2018 | Katsuragi | ............. | B61L 25/026 |
| 2019/0111953 | A1* | 4/2019 | Gao | ........................... | B61L 3/08 |

FOREIGN PATENT DOCUMENTS

| CA | 2299778 A1 * | 8/2000 | .......... B61L 15/0027 |
| CN | 103350709 A * | 10/2013 | |

(Continued)

OTHER PUBLICATIONS

International Search Report issued in PCT/CN2020/121782, Jan. 18, 2021 (2 pages).
(Continued)

*Primary Examiner* — Isaac G Smith
(74) *Attorney, Agent, or Firm* — HSML P.C.

(57) ABSTRACT

The present invention relates to a moving block train operation control method and system based on train autonomous positioning, where the method is centered on a train-mounted device, autonomous positioning and integrity checking are implemented for the train-mounted device through satellites, and a movement authority and a target distance curve are calculated according to a real-time position, speed, and line state of a preceding train and in combination with train-to-train communication train safety protection technology, thereby achieving moving block. Compared with the prior art, the present invention has the advantages that line use efficiency, system work efficiency
(Continued)

and operation efficiency are improved, a quantity of railside devices is reduced, and system construction and maintenance costs are reduced.

9 Claims, 3 Drawing Sheets

(58) Field of Classification Search
USPC .......................................................... 701/19
See application file for complete search history.

(56) References Cited

FOREIGN PATENT DOCUMENTS

| | | | | |
|---|---|---|---|---|
| CN | 106515797 | A | | 3/2017 |
| CN | 108839677 | A | | 11/2018 |
| CN | 10951849 | A * | | 4/2019 |
| CN | 208715215 | U | | 4/2019 |
| CN | 110632627 | A * | 12/2019 | ............. G01S 19/41 |
| CN | 110632627 | A | | 12/2019 |
| CN | 111114592 | A | | 5/2020 |
| EP | 3313067 | A1 * | | 4/2018 |
| JP | 2007-55431 | A | | 3/2007 |
| KR | 101769441 | B1 * | | 8/2017 |

OTHER PUBLICATIONS

Written Opinion issued in PCT/CN2020/121782, Jan. 18, 2021 (6 pages).

\* cited by examiner

MOVING BLOCK TRAIN OPERATION CONTROL METHOD AND SYSTEM BASED ON TRAIN AUTONOMOUS POSITIONING

FIELD OF TECHNOLOGY

The present invention relates to a moving block train operation control method and system, and in particular, to a moving block train operation control method and system based on train autonomous positioning.

BACKGROUND

At present, China's train operation control system CTCS is mainly divided into a ground device and a train-mounted device, a block manner may be divided into a fixed block manner, a quasi-moving block manner, and a moving block manner, a CTCS-3 level is used as an example, the CTCS-3 level system is a train operation control system with a CTCS-2 level function where train-ground information two-way transmission is implemented based on GSM-R wireless communication, a movement authority is generated by a radio block center RBC, train occupation detection is implemented by a rail circuit, and train positioning is implemented by a transponder. The CTCS-3 is a quasi-moving block system based on automatic fixed block. Because the system determines zone occupation by using a high-capacity point device and can inform subsequent trains of a distance by which the trains continue to move, that is, a movement authority, the subsequent trains formulate a speed target distance curve according to the movement authority, thereby reducing a train safety interval and achieving quasi-moving block control. However, in quasi-moving block, target braking points of the subsequent trains are still outside zones occupied by leading trains, which cannot break through the restriction of the rail circuit. As a result, moving block cannot be implemented. With the rapid development of China's economy, the requirements for a high-speed railway transportation capacity are increasing, and it is necessary to overcome the problem where moving block cannot be implemented in high-speed railway transportation. This requires starting from optimizing a structure of the train control system, breaking through the functional division of existing ground device and train-mounted device, and reorganizing the function allocation of the train control system. The overall layout and accuracy of a Beidou satellite positioning system in China are becoming more accurate, so that satellite navigation is applicable to high-speed railway train positioning. Therefore, the rail circuit can be canceled, the train positioning can be implemented independently by the train, and the moving block is implemented. Therefore, how to apply train autonomous positioning to moving block train operation control has become a technical problem to be solved.

SUMMARY

A purpose of the present invention is to provide a moving block train operation control method and system based on train autonomous positioning to overcome the defects in the prior art, to enhance a capability of a train-mounted device, reduce a railside device, optimize a structure of a train control system, improve system work efficiency, and reduce system construction and maintenance costs.

The purpose of the present invention may be achieved through the following technical solutions.

A moving block train operation control method based on train autonomous positioning is provided, where the method is centered on a train-mounted device, autonomous positioning and integrity checking are implemented for the train-mounted device through satellites, and a movement authority and a target distance curve are calculated according to a real-time position, speed, and line state of a preceding train and in combination with train-to-train communication train safety protection technology, thereby achieving moving block.

Preferably, a specific control process of the moving block is as follows:

step (1): calculating an accurate position of a train on a line, where the position includes a train maximum safety head and a train minimum safety tail;

step (2): obtaining, by the train-mounted device, an IP of a preceding train by using a center resource management system;

step (3): establishing, by the train-mounted device, wireless communication with the preceding train, and obtaining a position and a speed of the preceding train in real time;

step (4): obtaining, by the train-mounted device, an available line resource length and a dangerous point position ahead from the center resource management system;

step (5): calculating, by the train-mounted device, the movement authority; and step (6): calculating, by the train-mounted device, a dynamic monitoring curve of train operation in real time according to the movement authority, a maximum restricted speed profile, and baking performance of a train, and implementing moving block tracking operation of a train control system.

Preferably, the step (1) is specifically as follows:

calculating, by the train-mounted device, real-time position and speed information of the train by using a Beidou satellite receiver and a speed sensor, and performing position correction by using differential information provided by a differential base station, thus obtaining a train satellite antenna position P0;

setting a distance between the satellite antenna and a train head, thus obtaining a train estimated head position P, wherein due to a certain error (t) in satellite positioning, a confidence interval of the train estimated head position P is estimated according to positioning data and accuracy of the train, a maximum value is the train maximum safety head, which refers to a train position calculated according to a positive error, and the maximum value is greater than an estimated value of the train position, and a minimum value is a train minimum safety head, which refers to a train position calculated according to a negative error, and the minimum value is less than an estimated value of the train position;

similarly determining a minimum value of a train tail according to the positioning data and accuracy of the train, wherein the value is calculated according to a negative error and is less than an estimated value of a train tail position, which is referred to as the train minimum safety tail; and obtaining a safety envelope of the train on the line by obtaining the train maximum safety head and the train minimum safety tail through calculation Preferably, the step (5) is specifically as follows:

selecting, by the train-mounted device, the most restricted position as a movement authority terminal by referring to a reference preceding train position, a safety line length, and a dangerous point position, and reserving a set safety protection distance between a train maximum safety head and a preceding train minimum safety tail, where the distance can be configured according to the highest speed of the line.

A system using the moving block train operation control method based on train autonomous positioning is provided, where the system includes:

a train-mounted device located on a train;

an all-IP multi-mode communication network configured to perform communication connection between the train-mounted device and a ground device;

a railside device performing communication by using the all-IP multi-mode communication network; and a center device performing communication by using the all-IP multi-mode communication network.

Preferably, the train-mounted device includes a train-mounted safety computer and a speed sensor, a Beidou satellite receiving unit, a train integrity detection unit, a train interface unit, a data recording unit, a train-mounted multi-mode communication gateway, and a human-computer interface that are respectively connected to the train-mounted safety computer; and the train-mounted multi-mode communication gateway communicates with the ground device by using the all-IP multi-mode communication network.

Preferably, the railside device includes an object controller, a differential base station, and a railside multi-mode communication gateway, and the railside multi-mode communication gateway as well as the object controller, and the differential base station respectively communicate with the center device and the train-mounted device by using the all-IP multi-mode communication network.

Preferably, the center device includes a resource management system RMU, a dispatching centralized system, a differential management system, and a center multi-mode communication gateway, the resource management system RMU is respectively connected to the dispatching centralized system, the differential management system, and the center multi-mode communication gateway, and the center multi-mode communication gateway communicates with the railside device and the train-mounted device by using the all-IP multi-mode communication mode.

Compared with the prior art, the present invention has the following advantages:

(1) A conventional CTCS-3 level train control system adopts a train-ground wireless communication manner, and a large amount of train control safety information is transmitted between the train and the ground, and there is no direct information exchange between the train and the train. A current train needs to rely on a ground device to obtain position information of a preceding train, and data between the train and the preceding train is transmitted in a train-to-ground-to-train manner. The train-to-train direct communication in the present invention is obviously superior to the conventional CTCS-3 level train-to-ground-to-train transmission manner in terms of data transmission safety and effectiveness.

(2) With the continuous development of satellite navigation technology and wireless communication technology, the train-mounted device can have more functions and the capability of the train-mounted device is enhanced. Accurate train positioning is implemented by a multi-source sensor, an electronic map, and data fusion, train occupancy detection has evolved from a rail circuit to train autonomous positioning, and the rail circuit is removed and physical transponders are drastically reduced. In the present invention, the control concept changes from conventional "ground centralization" to "train-mounted centralization", thereby reducing system construction and maintenance costs.

(3) A movement authority of the conventional CTCS-3 level train control system is calculated by the ground device, and the train-mounted device is only responsible for overspeed protection. The vehicle-mounted device sends train position information and other train state information to a ground RBC, the RBC generates a movement authority by combining line information received from other ground devices, and then sends the movement authority to the train-mounted device, and a large amount of train control safety information is repeatedly exchanged in a wireless network. In the present invention, the train-mounted device directly calculates and generates the movement authority, which is superior to the conventional calculation of the movement authority and train control data train-to-ground-to-train transmission process.

(4) The ground device of the conventional CTCS-3 level train control system has more functions, the same function involves the information exchange between a plurality of ground devices, and complex communication interfaces increase the complexity of the system and affects the stability of the system. In the present invention, the railside device of the train control system is greatly reduced, and the center device is highly integrated.

DESCRIPTION OF THE EMBODIMENTS

Clear and complete description will be made to the technical solutions in embodiments of the present invention in conjunction with drawings in the embodiments of the present invention hereafter. Obviously, the described embodiments are merely a part of embodiments of the present invention and not all the embodiments. Based on the embodiments of the present invention, all of other embodiments obtained by a person of ordinary skill in the art without any creative effort shall belong to the protection scope of the present invention.

Train autonomous positioning is an important development direction of a next-generation train operation control system. In the present invention, a train-mounted device implements autonomous positioning and integrity detection through satellites, thereby canceling a rail circuit and implementing train occupancy detection. A movement authority may directly extend to a tail of a preceding train, and the train-mounted device may dynamically calculate the movement authority and a target distance curve according to a real-time position, speed, and line state of the preceding train and with reference to a train-to-train communication train safety protection technology, thereby achieving moving block. The implementation of satellite train-mounted autonomous positioning makes it possible for the conventional control concept of "ground centralization" to "train-mounted centralization". The functions of the train control system are further integrated and redistributed to enhance a capability of the train-mounted device, reduce the railside device, optimize the structure of the train control system, and reduce system complexity, thereby improving system work efficiency, and reducing system construction and maintenance costs.

Therefore, in the present invention, the train-mounted device is used as a core and the rail circuit is canceled. The train-mounted device replaces the railside device to implement train positioning and integrity detection, and the train-mounted device calculates the movement authority and implements moving block control of the train control system based on the train-to-train communication.

Figure 1:
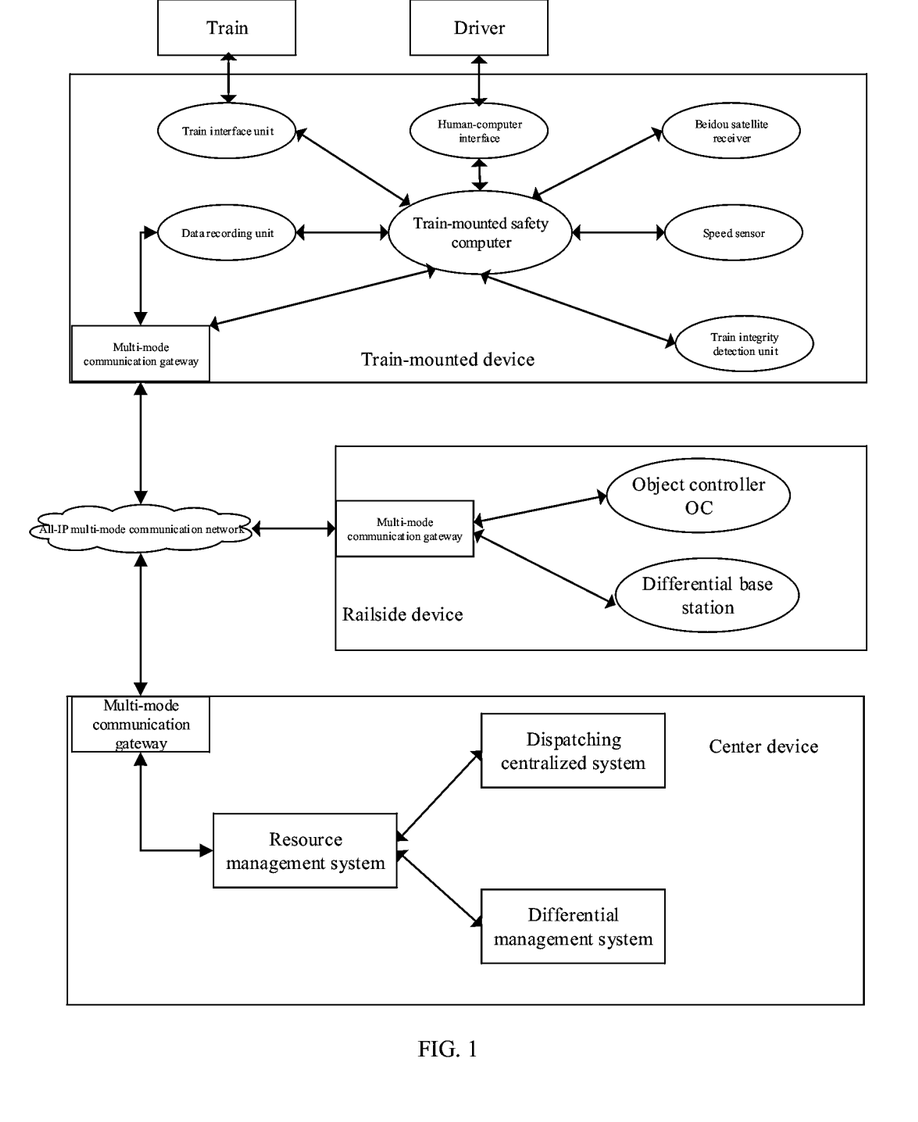
FIG. 1 is a schematic structural diagram of the present invention.

As shown in FIG. 1, the moving block control system based on train autonomous positioning is provided in the present invention, and the system includes: a train-mounted device, a railside device, an a center device. The train-mounted device is located on a train and includes a train-mounted safety computer, a speed sensor, a Beidou satellite receiving unit, a train integrity detection unit, a train interface unit, a data recording unit, and a multi-mode communicate gateway. The railside device includes an object controller, a differential base station, and the multi-mode communication gateway. The center device includes a resource management system RMU, a dispatching centralized system, a differential management system, and the multi-mode communication gateway.

Based on the optimized system structures and functions, the moving block control scheme provided in the patent is as follows:

(1) Calculate an accurate position of a train on a line, where the position includes a maximum safety head and a minimum safety tail.

Figure 2:
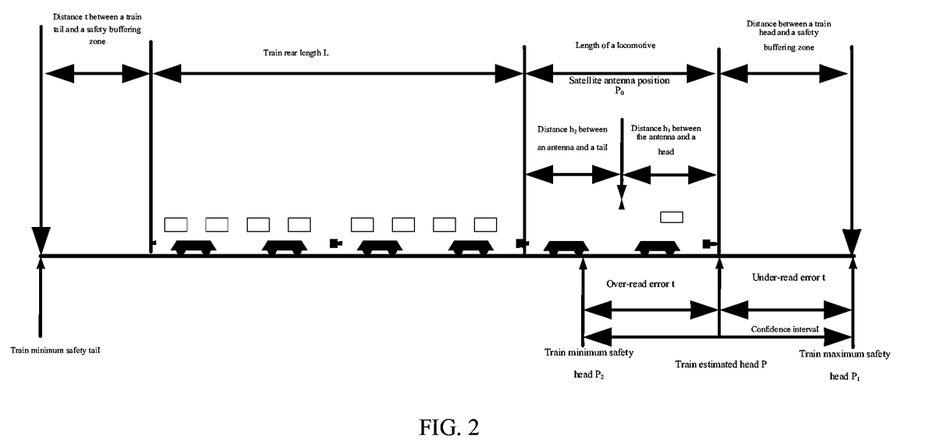
FIG. 2 is a schematic diagram of a present invention train estimated head, a confidence interval, a maximum safety head and a minimum safety head, and a minimum safety tail.

The train-mounted computer calculates real-time position and speed information of a train by using the Beidou satellite receiver and the speed sensor, and performs position correction by using differential information provided by the differential base station, thus obtaining a train satellite antenna position P0. The satellite antenna has a certain distance from a train head, thus obtaining a train estimated head position P. Due to a certain error (t) in satellite positioning, a confidence range, that is, a confidence interval, of the train estimated head position P is estimated according to positioning data and accuracy of the train, a maximum value is the train maximum safety head, which refers to a train position calculated according to a positive error, and the maximum value is greater than an estimated value of the train position, and a minimum value is a train minimum safety head, which refers to a train position calculated according to a negative error, and the minimum value is less than an estimated value of the train position. A minimum value of a train tail is determined similarly according to the positioning data and accuracy of the train, where the minimum value is calculated according to a negative error and is less than an estimated value of a train tail position, which is referred to as the train minimum safety tail. A safety envelope of the train on the line is obtained by obtaining the train maximum safety head and the train minimum safety tail through calculation. FIG. 2 is a schematic diagram of a train estimated head, a confidence interval, a maximum safety head and a minimum safety head, and a minimum safety tail. Specific calculation processes are as follows:

The train maximum safety head $P1=P+t$;
The train minimum safety head $P2=P-t$;
The confidence interval: $(P2, P1)$; and
The train minimum safety tail $P3=P0-h2-L-t$;

(2) Obtain, by the train-mounted device, an IP of a preceding train by using the center resource management system.

(3) Establish, by the train-mounted device, wireless communication with the preceding train, and obtain a position and a speed of the preceding train in real time.

(4) Obtain, by the train-mounted device, an available line resource length and a dangerous point position ahead from the center resource management system.

(5) Calculate, by the train-mounted device, the movement authority. The train-mounted device selects the most restrictive position as a movement authority terminal by referring to a reference preceding train position, a safety line length, and a dangerous point position. The train-mounted device should reserve a set safety protection distance between a train maximum safety head and a preceding train minimum safety tail, where the distance can be configured according to the highest speed of the line.

Figure 3:
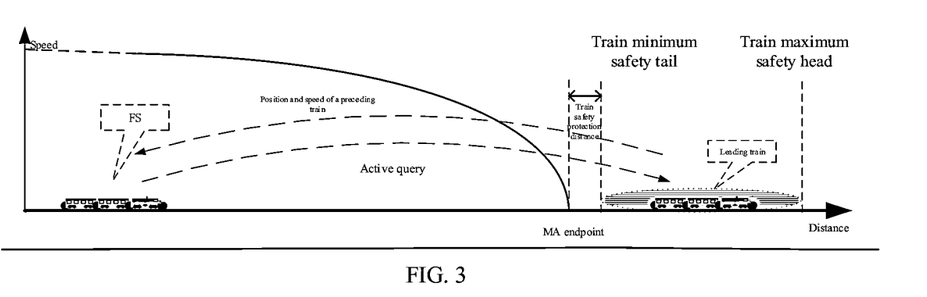
FIG. 3 is a schematic diagram of tracking operation in a moving block section of the present invention.

(6) Calculate, by the train-mounted device, a dynamic monitoring curve of train operation in real time according to the movement authority, a maximum restricted speed profile, and baking performance of a train, and implement moving block tracking operation of a train control system, as shown in FIG. 3.

Figure 5:
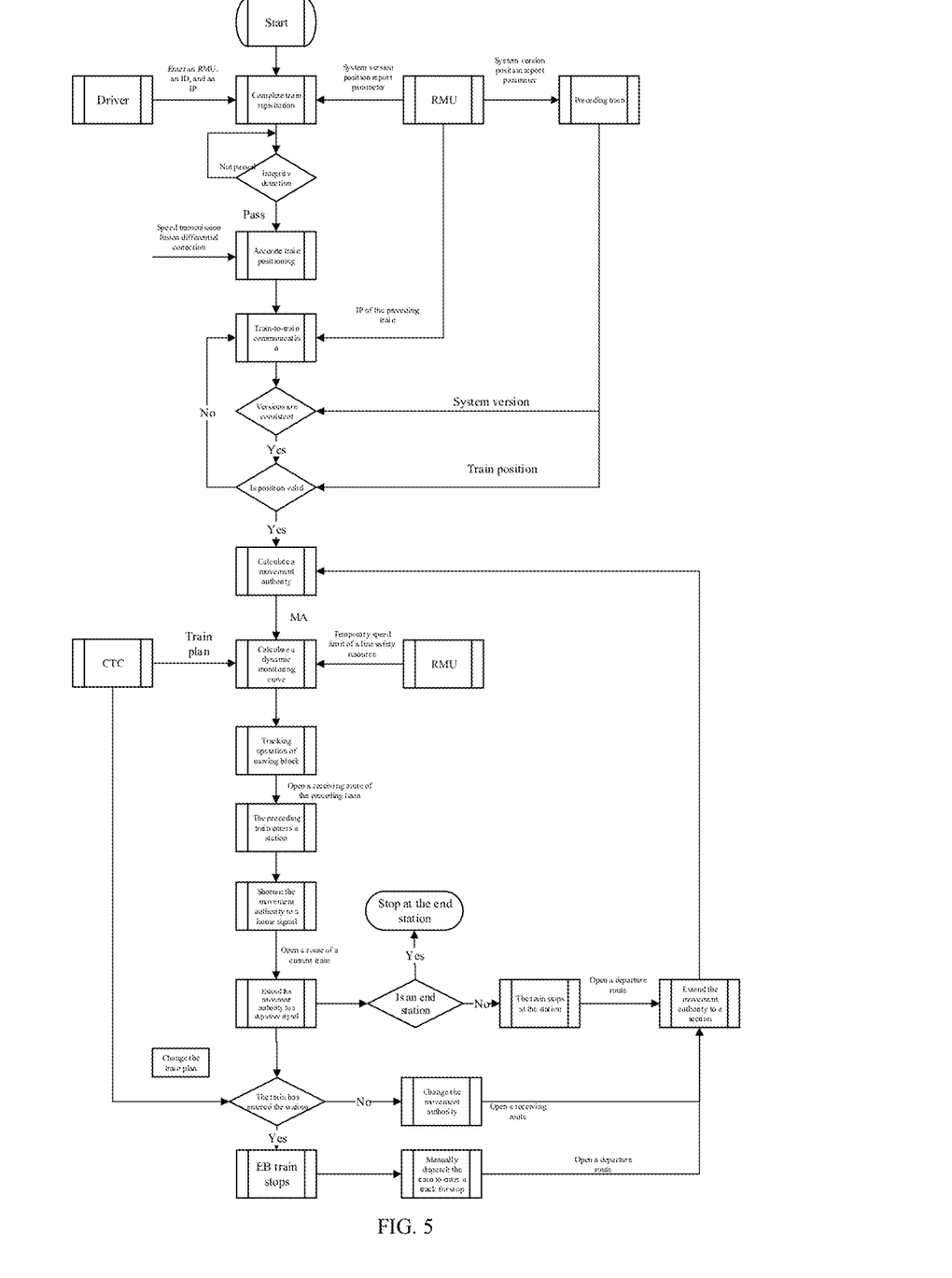
FIG. 5 is a flowchart of moving block control based on train autonomous positioning.

In the present invention, according to the moving block train operation control method, based on train-mounted autonomous positioning and integrity detection, and a case where the train-mounted device calculates a movement authority is used as a core, and the train-mounted device needs to communicate with the center resource management system in a wireless way, to obtain a line resource and preceding train information, and a preceding train position and a speed are directly obtained through train-to-train communication, thereby ensuring data transmission safety and efficiency. A specific implementation process of the moving block train operation control method in the present invention is described in detail below. A control flowchart is shown in FIG. 5.

Figure 4:
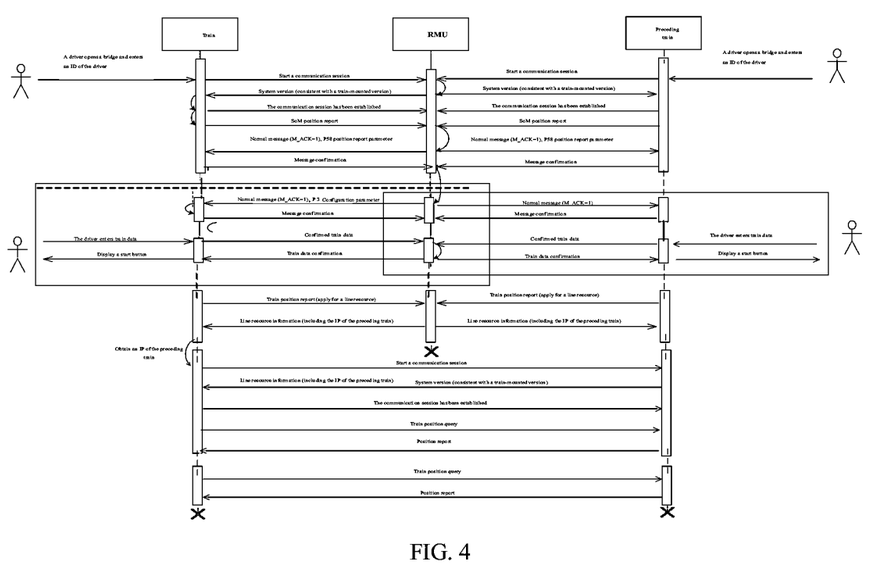
FIG. 4 is a time sequence diagram of train-to-ground and train-to-train communication in moving block of the present invention.

(1) a driver opens a bridge and enters a valid ID and IP of an RMU, and the driver confirms that the RMU is connected;

(2) all trains within a jurisdiction are registered and connected to the RMU;

(3) integrity detection is performed on registered trains, to complete accurate positioning;

(4) the RMU obtains position information of the registered trains on the whole line;

(5) the train periodically applies to the RMU for a preceding train resource and a line resource;

(6) the RMU responds to information according to the train and line resources of the whole line;

(7) the train obtains information about a preceding train IP and a line safety resource ahead by using the RMU;

(8) the train actively initiates a communication session with the preceding train, detects a system version, and establishes the communication session with the preceding train if the system version is consistent with a local version;

(9) the train establishes the communication session with the preceding train, periodically sends "train position query" messages to query a position of the preceding train, sends the "train position query" messages to the preceding train at regular intervals (configurable) if a received train position sent by the preceding train is valid, and directly obtains a position and a speed of the preceding train; and a specific time sequence is shown in FIG. 4.

(10) the current communication session is end if the received train position sent by the preceding train is invalid, and step (7) is repeated;

(11) the train travels in a section, where an endpoint of a movement authority of the train is a train minimum safety tail that is in front of a home signal and that is nearest to the train plus a certain safety protection distance; and a train operation dynamic monitoring curve is calculated according to a principle of moving block and with reference to a maximum restricted speed profile and a braking parameter of the train;

(12) the preceding train enters a station, and the train shortens the movement authority to in front of the home signal of the station;

(13) the preceding train leaves the station, the train receives a pick-up plan of a station ahead, a receiving route is opened at the same time, and the movement authority of the train is extended to a departure signal;

(14) if the endpoint of the movement authority is in the departure signal of the station, a CTC changes a movement plan, and a route is changed, and the train-mounted device determines whether the movement authority can be updated according to the latest route, if the movement authority can be updated, updates the movement authority, and if the movement authority cannot be updated, the train immediately EB stops, and after a dispatcher performs confirmation, the train is manually moved to a track for stop;

(15) the train enters the track and stops, a departure route is opened according to a movement plan, and the movement authority is extended to the section; and (16) step (11) is repeated if there is no dangerous point such as blocking in the section.

The above descriptions are only specific implementations of the present invention. However, the protection scope of the present invention is not limited thereto, any person skilled in the art can easily think of various equivalent modifications or substitutions within the technical scope disclosed by the present invention, and all of these modifications or substitutions shall fall within the protection scope of the present invention. Therefore, the protection scope of the present invention should be determined with reference to the appended claims.

What is claimed is:

1. A moving block train operation control method based on train autonomous positioning, the method comprising:
    a train-mounted device autonomously positioning a train and performing train integrity checking via satellites;
    determining a real-time position, speed, and line state of a preceding train via a train-to-train communication; and
    dynamically determining a movement authority and a target distance based on the real-time position, speed, and line state of the preceding train according to a train safety protection mechanism,
    wherein a control process of the moving block includes:
        step (1): determining a position of the train on a line, wherein the position comprises a train maximum safety head and a train minimum safety tail;
        step (2): obtaining, by the train-mounted device, an IP of the preceding train via a center resource management system;
        step (3): establishing, by the train-mounted device, wireless communication with the preceding train, and obtaining a position and a speed of the preceding train in real time;
        step (4): obtaining, by the train-mounted device, an available length of track resource and a point position ahead from the center resource management system;
        step (5): determining, by the train-mounted device, the movement authority; and
        step (6): dynamically monitoring, by the train-mounted device, train operation in real time according to the movement authority, a maximum restricted speed profile, and baking performance of a train, and controlling the train with moving block tracking operation of a train control system.

2. The moving block train operation control method based on train autonomous positioning according to claim 1, wherein the step (1) includes:
    determining, by the train-mounted device, real-time position and speed information of the train by using a Beidou satellite receiver and a speed sensor, and performing position correction by using differential information provided by a differential base station, thus obtaining a train satellite antenna position $P_0$;
    setting a distance between the satellite antenna and a train head, thus obtaining a train estimated head position P, wherein due to a positive error or a negative error in satellite positioning, a confidence interval of the train estimated head position P is estimated according to positioning data of the train and a required precision of the positioning data, a maximum value is the train maximum safety head, which refers to a train position calculated according to the positive error, and the maximum value is greater than an estimated value of the train position, and a minimum value is a train minimum safety head, which refers to a train position calculated according to the negative error, and the minimum value is less than an estimated value of the train position;
    similarly determining a minimum value of a train tail according to the positioning data of the train and the required precision of the positioning data, wherein the value is calculated according to the negative error and is less than an estimated value of a train tail position, which is referred to as the train minimum safety tail; and
    obtaining a safety envelope of the train on the line by obtaining the train maximum safety head and the train minimum safety tail through calculation.

3. The moving block train operation control method based on train autonomous positioning according to claim 2, wherein the step (5) includes:
    selecting, by the train-mounted device, an end of the movement authority based on a reference preceding train position, a safety line length, and the point position of the train from the center resource management system, and reserving a set safety protection distance between a train maximum safety head and a preceding train minimum safety tail, wherein the distance can be configured according to the highest speed of the line.

4. A system comprising:
    a train-mounted device located on a train;
    an all-IP multi-mode communication network configured to perform communication connection between the train-mounted device and a ground device;
    a railside device; and
    a center device, wherein the train-mounted device, the railside device, and the center device are configured to communicate with each other via the all-IP multi-mode communication network, wherein the system is configured to perform moving block train operation control steps including:

the train-mounted device autonomously positioning a train and performing train integrity checking via satellites;

determining a real-time position, speed, and line state of a preceding train via a train-to-train communication; and dynamically determining a movement authority and a target distance based on the real-time position, speed, and line state of the preceding train according to a train safety protection mechanism, wherein a control process of the moving block includes:

step (1): determining a position of the train on a line, wherein the position comprises a train maximum safety head and a train minimum safety tail;

step (2): obtaining, by the train-mounted device, an IP of the preceding train via a center resource management system;

step (3): establishing, by the train-mounted device, wireless communication with the preceding train, and obtaining a position and a speed of the preceding train in real time;

step (4): obtaining, by the train-mounted device, an available length of track resource and a point position ahead from the center resource management system;

step (5): determining, by the train-mounted device, the movement authority; and step (6): dynamically monitoring, by the train-mounted device, train operation in real time according to the movement authority, a maximum restricted speed profile, and baking performance of a train, and controlling the train with moving block tracking operation of a train control system.

5. The system according to claim 4, wherein the train-mounted device comprises a train-mounted safety computer, a speed sensor, a Beidou satellite receiving unit configured to receive data from the Beidou satellite, a train integrity detection unit configured to detect the train integrity, a train interface unit configured to interface with the train, a data recording unit configured to store data, a train-mounted multi-mode communication gateway, and a human-computer interface, the speed sensor, the Beidou satellite receiving unit, the train integrity detection unit, the train interface unit, the data recording unit, the train-mounted multi-mode communication gateway, and the human-computer interface are respectively connected to the train-mounted safety computer; and the train-mounted multi-mode communication gateway is configured to communicate with the ground device via the all-IP multi-mode communication network.

6. The system according to claim 4, wherein the railside device comprises a controller, a differential base station, and a railside multi-mode communication gateway, and the railside multi-mode communication gateway as well as the controller, and the differential base station are respectively configured to communicate with the center device and the train-mounted device via the all-IP multi-mode communication network.

7. The system according to claim 4, wherein the center device comprises a resource management system RMU, a dispatching centralized system, a differential management system, and a center multi-mode communication gateway, the resource management system RMU is respectively connected to the dispatching centralized system, the differential management system, and the center multi-mode communication gateway, and the center multi-mode communication gateway are configured to communicate with the railside device and the train-mounted device via the all-IP multi-mode communication mode.

8. The system according to claim 7, wherein the system is further configured to perform moving block train operation control steps including:

step (i): inputting a valid identification and IP of the RMU via a console, and confirming that the RMU is connected to the console;

step (ii): registering and connecting the train the RMU;

step (iii): performing the train integrity checking on the registered train to position the train;

step (iv): the RMU obtaining position data of the registered train;

step (v): the train periodically applying for, via the RMU, a preceding train resource and a track resource;

step (vi): the RMU responding to the train based on train and track resources;

step (vii): the train obtaining data of a preceding train IP and a track safety resource ahead via the RMU;

step (viii): the train actively initiating a communication session with the preceding train, detecting a system version, and establishing the communication session with the preceding train when the system version matches a local version;

step (ix): the train periodically sending messages to query a position of the preceding train, sending the messages to the preceding train at regular intervals if a received train position sent by the preceding train is valid, and directly obtaining a position and a speed of the preceding train;

step (x): ending the current communication session when the received train position sent by the preceding train is invalid, and repeating the step (vii);

step (xi): the train traveling in a section, wherein an endpoint of the movement authority of the train is the train minimum safety tail that is in front of a home signal device and that is nearest to the train plus a certain safety protection distance;

step (xii): preceding train entering a station, and the train shortening the movement authority to a position in front of the home signal device of the station;

step (xiii): the preceding train leaving the station, the train receiving a pick-up plan of a station ahead, opening a receiving route, and extending the movement authority of the train to a departure signal device of the station;

step (xiv): when the endpoint of the movement authority is at the departure signal device of the station, changing a movement plan the route, and the train-mounted device determining an update to the movement authority;

step (xv): the train entering the track and stopping, opening a departure route, and extending the movement authority to the section; and step (xvi): repeating the step (xi) when no point position being identified.

9. The moving block train operation control method based on train autonomous positioning according to claim 4, wherein the train maximum safety head P1 is the train estimated head position P plus the positive error (P1=P+t), the train minimum safety head P2 is the train estimated head position P plus the negative error (P2=P−t), the confidence interval is a range (P2, P1) between P1 and P2, the train minimum safety tail P3 is train satellite antenna position $P_0$ minus a distance $h_2$ between the antenna position $P_0$ and a tail of a locomotive of the train, a length L of the train without the locomotive, and a distance between the train tail and a safety buffer zone Z (P3=$P_0$−h2−L−Z), and the safety envelope is a range (P3, P1) between the train maximum safety head P1 and the train minimum safety tail P3.

* * * * *